June 9, 1931. C. A. CAMPBELL 1,808,835
SUPPORT FOR LUBRICATORS
Filed Nov. 27, 1926 2 Sheets-Sheet 1
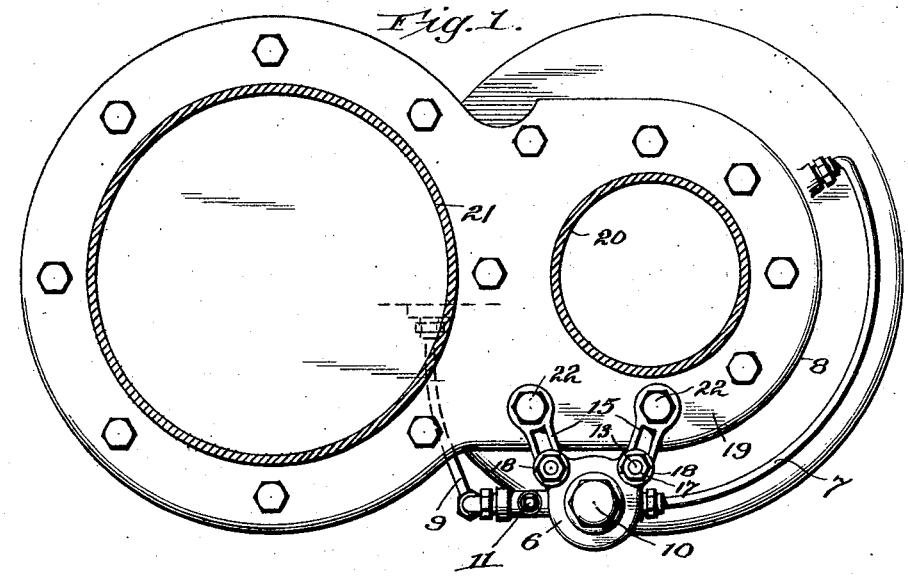
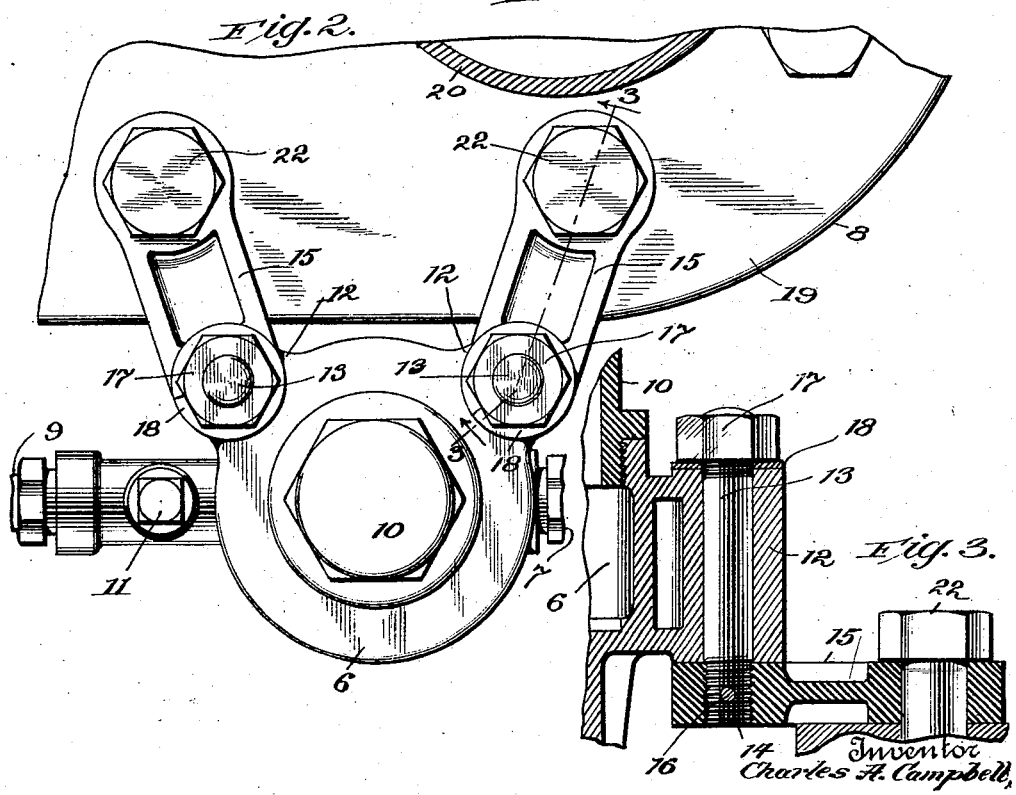
Inventor
Charles A. Campbell
By Dodge
Attorneys.

June 9, 1931. C. A. CAMPBELL 1,808,835
SUPPORT FOR LUBRICATORS
Filed Nov. 27, 1926 2 Sheets-Sheet 2
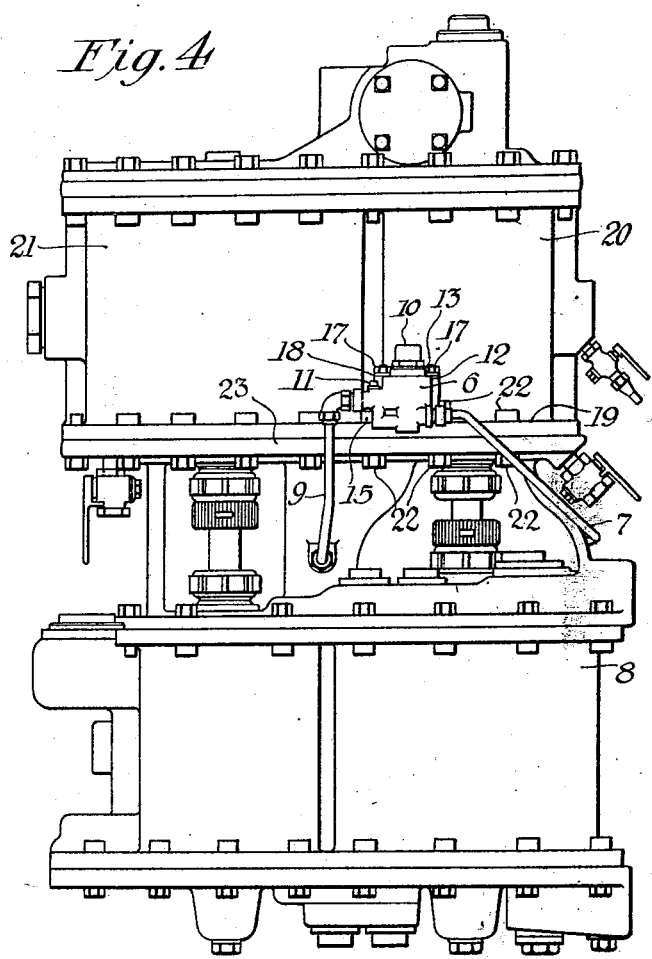
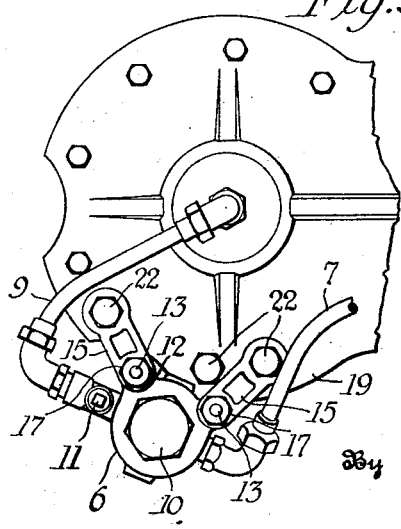
Inventor
Charles A. Campbell Patented June 9, 1931

1,808,835

UNITED STATES PATENT OFFICE

CHARLES ALBERT CAMPBELL, OF WATERTOWN, NEW YORK, ASSIGNOR TO THE NEW YORK AIR BRAKE COMPANY, A CORPORATION OF NEW JERSEY

SUPPORT FOR LUBRICATORS

Application filed November 27, 1926. Serial No. 151,223.

This invention relates to supports for lubricators, and particularly to supports for lubricators applied to air pumps used to charge the main reservoir in railway air brake systems. I show the invention as applied to the lubricator described and claimed in my copending application Serial No. 643,691, filed June 6, 1923, but its utility is not confined to the mounting of this particular type of lubricator.

The purpose of the invention is to provide a mounting which will not release the lubricator in the event that nuts work off, and which will permit the lubricator to be mounted by connection with the cylinder bolts of variously specifically different air compressors, regardless of the spacing of the cylinder bolts.

The preferred embodiment of the invention is illustrated in the accompanying drawings, in which Fig. 1 is a view, partly in plan and partly in horizontal section, through the steam cylinders of a vertical compound air brake pump. It will be understood that the air cylinders are mounted below the steam cylinders.

Fig. 2 is an enlarged fragmentary view of a portion of Fig. 1; and

Fig. 3 is a section on the line 3—3 of Fig. 2.

Fig. 4 is an elevation of a pump with my invention attached.

Fig. 5 is a view showing how the lubricator may be mounted on a flange or head having a different bolt spacing.

The lubricator body is shown at 6, and an example chosen for illustration is of the aspirating feed type which requires two connections, one a pipe connection 7 with a low pressure air cylinder 8, and a pipe connection 9 which leads to a high pressure air cylinder. It will be understood that the high pressure steam cylinder drives the low pressure air cylinder, and vice versa.

The filling cap for the lubricator is illustrated at 10, while 11 is a plug which may be removed to give access to a check valve forming part of the lubricator structure. The lubricator is so designed that it feeds oil to both air cylinders. The body of the lubricator is formed with two projecting lugs, 12, 12, each of which is drilled to receive a stud 13 threaded at 14 into an arm 15, the threaded connection 14 being locked by means of a stake or pin 16. The upper end of each stud 13 is threaded to receive a nut 17, and this nut is held in position by an ordinary spring lock washer 18. The arms 15 thus underlie the lugs 12 and they overlie the lower flange 19 of the steam cylinders 20 and 21, and are connected thereto by bolts 22 which pass through the flange 19 and also through the center plate 23 of the pump. The bolts 22 are thus merely two of the ordinary cylinder head bolts. The construction is such that the arms 15 may be adjusted to conform to any ordinary spacing of the bolts 22, which renders the lubricator applicable to a wide range of compressors, and as the studs 13 are rather closely spaced, the arms 15 are splayed and permit moderate angular motion of the lubricator. This facilitates the making of pipe connections. (Compare Figs. 2 and 5.) The arms 15 are firmly held by the bolts 22, which must be kept tight to keep the compressor tight. If the nuts 17 should jar off the lubricator will still be retained because of the length of the studs 13 and the fact that they project upward from the arms 15.

What is claimed is:—

1. The combination of a lubricator, and a pair of supporting arms pivoted thereto on parallel axes, said arms having bolt holes adjacent their outer ends, and parallel with said pivot axes.

2. The combination of a lubricator, and a pair of arms pivoted thereto on substantially vertical axes which are spaced from each other, said arms being formed with bolt holes at their outer ends, the axes of said bolt holes being substantially vertical.

3. The combination of a lubricator body; a pump structure having a plurality of spaced threaded connectors which hold parts of the pump structure in assembled relation; and a pair of supporting arms pivoted to said lubricator body on axes parallel with each other and with the axes of said threaded connectors and each engaged and supported by a corresponding one of said connectors.

4. The combination of a lubricator body, a pump structure having a plurality of spaced threaded connectors which hold parts of the pump structure in assembled relation; a pair of arms each supported by a corresponding one of said threaded connectors and each underlying a portion of the lubricator body; pins projecting upward from said arms through a portion of said lubricator body said pins being parallel with each other and with the axes of said threaded connectors; and removable means on said pins for retaining said body.

In testimony whereof I have signed my name to this specification.

CHARLES ALBERT CAMPBELL.